United States Patent [19]

Henton

[11] 3,999,999
[45] Dec. 28, 1976

[54] BINDER AND METHOD OF MAKING IT
[75] Inventor: Paul V. Henton, St. Louis, Mo.
[73] Assignee: Emerson Electric Co., St. Louis, Mo.
[22] Filed: June 16, 1975
[21] Appl. No.: 586,866
[52] U.S. Cl. .............................................. 106/85
[51] Int. Cl.² ........................................ C04B 7/02
[58] Field of Search ..................................... 106/85
[56] References Cited

UNITED STATES PATENTS

| | | | |
|---|---|---|---|
| 3,167,439 | 1/1965 | Vukasovich et al. | 106/85 |
| 3,179,527 | 4/1965 | Vukasovich et al. | 106/85 |
| 3,885,978 | 5/1975 | Doi et al. | 106/85 |

Primary Examiner—J. Poer
Attorney, Agent, or Firm—Polster and Polster

[57] ABSTRACT

An aluminum phosphate type binder composition includes certain other metallic phosphates in proportions of equivalents of aluminum to the other metals between about 0.70 and 2.90, and proportions of the sums of all of the metals to mole equivalents of phosphoric acid lie between about 1.00 and 1.80. A method of producing the binder includes adding a slurry of aluminum hydroxide and certain other metallic salts to phosphoric acid in such a way as to generate sufficient heat to permit the reaction to proceed to completion at or near the boiling point.

10 Claims, No Drawings

3,999,999

BINDER AND METHOD OF MAKING IT

CROSS REFERENCE TO RELATED APPLICATION

This application contains subject matter common to my application entitled Method of Making Molded Blocks, Ser. No. 586,867, filed June 16, 1975.

BACKGROUND OF THE INVENTION

This invention relates to a method of preparing and the composition of a new and unique modified aluminum phosphate binder which has particular utility in binding crystalline zeolite molecular sieve, activated alumina, activated alumina gel and other desiccants into integral porous units using the desiccants separately or in combination with each other.

Preparation of phosphate binders now in use requires long periods of heating, special mixing and separation operations, addition of an organic acid to the reaction mixture, careful evaporation of water from the reacted material, or some other complicated, expensive, or time-consuming procedures before the binder can be used. The binder of this invention requires none of these procedures for its preparation and, in addition, takes advantage of the heat generated by the reaction of the components to minimize or eliminate the necessity of adding heat to the reaction vessel.

One of the objects of this invention is to provide a modified aluminum phosphate binder using relatively plentiful and economical materials.

Another object is to provide such a binder by a simple direct procedure.

Still another object is to provide such a binder without the necessity of adding materials in its preparation which would need to be separated from the binder before it could be used or would need to be eliminated by a relatively high temperature firing operation after use.

SUMMARY OF THE INVENTION

An aluminum phosphate type binder composition is provided in which ratios of equivalents of aluminum to one or more of certain other metals from a group including but not limited to calcium, magnesium, zinc, strontium, antimony, lead, iron and cadmium, lie between about 0.70 and 2.90, and ratios of the sums of the equivalents of all of the metals in the particular composition to the molar equivalent of phosphoric acid lie between about 1.00 and 1.80. A method of producing the binder is provided in which a slurry of aluminum hydroxide and one or more compounds from a group including but not limited to calcium oxide, magnesium oxide, calcium hydroxide, magnesium hydroxide, dolomitic quick lime, dolomitic hydrated lime and oxides of zinc, strontium, antimony, lead, iron and cadmium is added to phosphoric acid in such a way as to generate sufficient heat to permit the reaction to proceed to completion at or near the boiling point. The reaction product is diluted, if desired, and is immediately ready for use.

DESCRIPTION OF THE PREFERRED EMBODIMENT

The binder of this invention is the reaction product of aluminum hydroxide and certain metal compounds, and phosphoric acid. The metal compounds are preferably at least one of the following: calcium oxide, magnesium oxide, calcium hydroxide, magnesium hydroxide, dolomitic quick lime and dolomitic hydrated lime. These compounds are preferred because they produce excellent binders, are non-toxic, cheap and abundant. However, for particular applications and under special conditions, oxides or hydroxides, of strontium, antimony, lead, iron, cadmium or zinc may be used in place of or in conjunction with calcium and magnesium or either of them. Other compounds such as carbonates may also be used, but with certain disadvantages which are not met in the use of the oxides and hydroxides.

The ratios of the equivalents of aluminum to the other metals are critical, as are the ratios of the sums of the equivalents of all of the metals to the molar equivalent of phosphoric acid, as is explained in detail hereinafter.

The method of preparation of the binder of this invention consists essentially of the addition of a slurry of aluminum hydroxide and one or a blend of materials preferably selected from CaO, MgO, Ca(OH)$_2$, Mg(OH)$_2$, dolomitic quick lime, or dolomitic hydrated lime to a stirred quantity of phosphoric acid in a controlled manner as described more fully below. The use of calcium and magnesium carbonates as occur in uncalcined dolomite or high magnesium limestone is possible in this method, but their use will cause problems because the high viscosity of the binder and the release of $CO_2$ will create a foaming condition that is hard to control.

In the following example, the amount of phosphoric acid is given based on 75% acid as this is the strength most readily available as well as being the most economical. It is not to be construed, however, as limiting this invention to the use of 75% acid. Binders have been made using acids varying from 40 to 100% phosphoric acid in strength. The only criterion that has been applied in practice is that the weights and the relative amounts of water and 100% acid be such as to give the proper ratio of metallic and acid components and the finished binder a specific gravity at or above the specified control point.

EXAMPLE OF BINDER PREPARATION

1. Make a slurry (a suspension of solids) with the following materials.

| a. | Water | 500 parts by wt. |
|---|---|---|
| b. | Aluminum hydroxide (hydrated alumina) | 295 parts by wt. |
| c. | Calcium oxide | 35 parts by wt. |
| d. | Magnesium oxide | 75 parts by wt. |

Add the solids into the water while stirring and continue stirring until a smooth homogenous mix is obtained, (approximate time will vary with the efficiency of the stirrer).

2. While the slurry is being mixed, add to a vessel equipped with a stirrer and resistant to hot phosphoric acid 1710 parts by weight 75% $H_3PO_4$, 200 parts by weight of water.

3. Add approximately ⅔ of the slurry slowly to the stirred acid and then wait for the temperature to stabilize at or close to the boiling point (around 220° F.).

4. Add the remainder of the slurry at such a rate as to keep the reaction at the boiling point but not so fast as to boil the contents out of the vessel.

5. Rinse the slurry vessel into the acid vessel with as small an amount of water as possible.

6. Allow the reaction to continue to completion.
7. Sample and check temperature and specific gravity.
8. Dilute, if necessary, to 1.54 sp. gr. at about 150° F. and binder is ready for use.

The foregoing description has been given as outlining the binder preparation method. It will, however, also serve as an example of the binder composition which will be detailed in the following description.

It will be noted that the binder as prepared by this method contained calcium, magnesium, aluminum, and phosphoric acid. They are present as a complex mixture of all the possible reaction products of the slurry materials and phosphoric acid. It has been found that not all of the possible combinations of these materials will make a useful binder. The ratio of aluminum to the sum of the calcium and magnesium (all expressed as chemical equivalents) has limiting values within which the binder will perform its function in producing stable molded porous units. Outside of these limits the binder will produce weak or unstable molded porous units.

It has also been discovered that stable porous molded units can be made with the binder of this invention in which the ratio of total equivalents of calcium, magnesium and aluminum to moles of phosphoric acid can vary within relatively large limits. The ratio discloses the number of hydrogens of the three in phosphoric acid that have been reacted with the magnesium, calcium and aluminum compounds. It is well known that the first hydrogen of phosphoric acid reacts vigorously but that the remaining two are much less reactive. Using the method of this invention it would be practically impossible to react more than the first hydrogen with aluminum hydroxide; however, using the materials of this invention, binders have been made wherein 80% of the second hydrogen has been neutralized. The solubility in water of the final binder components is least with high metallic content and vice versa.

With the foregoing explanation, these ratios may now be defined as follows:

$$R_1 = \frac{Al^{+++}}{Ca^{++} + Mg^{++}}$$

$$R_2 = \frac{Al^{+++} + Ca^{++} + Mg^{++}}{(Moles\ H_3PO_4)}$$

With $Ca^{++}$, $Mg^{++}$, and $Al^{+++}$ as chemical equivalents.

Using the example of the method of this invention, a sample calculation follows:

$$Ca\ O = 35\ parts = \frac{35}{28} = 1.25\ equiv.\ Ca$$

$$Mg\ O = 75\ parts = \frac{75}{20} = 3.75\ equiv.\ Mg$$

$$Al(OH)_3 = 295\ parts\ 32\ \frac{295}{26} = 11.32\ equiv.\ Al$$

The denominator in the foregoing ratios represents the molecular weight of the compound divided by the valence of the metal.

75% $H_3PO_4$ = 1710 parts $$= 1280\ parts\ 100\% = \frac{1280}{98} = 13.06\ mole\ equivalent$$

$$R_1 = \frac{11.32}{1.25 + 3.75} = 2.26$$

$$R_2 = \frac{1.25 + 3.75 + 11.32}{13.06} = 1.25$$

The composition of the binder of this invention can be characterized by a combination of $R_1$ and $R_2$ wherein the $R_1$ and $R_2$ have the following limits:

$R_1$ lies between 0.70 and 2.90
$R_2$ lies between 1.00 and 1.80

The following examples are given to illustrate the wide range of compositions of binders possible with the disclosed method. It is understood that the calcium and magnesium equivalents can come from pure or impure CaO, MgO, Ca(OH)$_2$, Mg(OH)$_2$, dolomite, or a combination of dolomite and pure or impure oxides or hydroxides of calcium and magnesium. The aluminum equivalents can be supplied by a commercial form of aluminum hydroxide such as Alcoa's hydrated alumina C-30BF. The phosphoric acid is given as moles of 100% phosphoric acid, however, it is understood that this can be supplied by an equivalent amount of any strength acid between 40 and 100% acid or sufficient $P_2O_5$ and water to make the corresponding acid.

EXAMPLE I
$R_1 = 2.27;\ R_2 = 1.39$
| | |
|---|---|
| Magnesium | 1.90 equivalents |
| Calcium | 2.99 equivalents |
| Aluminum | 11.10 equivalents |
| Phosphoric acid | 11.50 mole equivalent |

EXAMPLE II
$R_1 = 0.70;\ R_2 = 1.20$
| | |
|---|---|
| Magnesium | 9.23 equivalents |
| Calcium | 0 equivalents |
| Aluminum | 6.45 equivalents |
| Phosphoric acid | 13.06 mole equivalent |

EXAMPLE III
$R_1 = 1.00;\ R_2 = 1.50$
| | |
|---|---|
| Magnesium | 9.80 equivalents |
| Calcium | 0 equivalents |
| Aluminum | 9.80 equivalents |
| Phosphoric acid | 13.06 mole equivalent |

EXAMPLE IV
$R_1 = 1.70;\ R_2 = 1.20$
| | |
|---|---|
| Magnesium | 5.83 equivalents |
| Calcium | 0 equivalents |
| Aluminum | 9.90 equivalents |
| Phosphoric acid | 13.06 mole equivalent |

EXAMPLE V
$R_1 = 2.25;\ R_2 = 1.25$
| | |
|---|---|
| Magnesium | 3.77 equivalents |
| Calcium | 1.25 equivalents |
| Aluminum | 11.32 equivalents |
| Phosphoric acid | 13.06 mole equivalent |

EXAMPLE VI
$R_1 = 2.25;\ R_2 = 1.25$
| | |
|---|---|
| Magnesium | 1.25 equivalents |
| Calcium | 3.77 equivalents |
| Aluminum | 11.32 equivalents |
| Phosphoric acid | 13.06 mole equivalent |

EXAMPLE VII
$R_1 = 2.25;\ R_2 = 1.25$
| | |
|---|---|
| Magnesium | 2.51 equivalents |
| Calcium | 2.51 equivalents |
| Aluminum | 11.32 equivalents |
| Phosphoric acid | 13.06 mole equivalent |

EXAMPLE VIII
$R_1 = 1.58;\ R_2 = 1.25$
| | |
|---|---|
| Magnesium | 2.91 equivalents |
| Calcium | 3.26 equivalents |
| Aluminum | 9.70 equivalents |
| Phosphoric acid | 12.70 mole equivalent |

EXAMPLE IX
$R_1 = 1.18;\ R_2 = 1.25$
| | |
|---|---|
| Magnesium | 3.43 equivalents |
| Calcium | 3.85 equivalents |
| Aluminum | 8.62 equivalents |
| Phosphoric acid | 12.70 mole equivalent |

EXAMPLE X
$R_1 = 2.20;\ R_2 = 1.05$
| | |
|---|---|
| Magnesium | 1.92 equivalents |
| Calcium | 2.35 equivalents |
| Aluminum | 9.38 equivalents |

-continued

| | | |
|---|---|---|
| Phosphoric acid | 13.00 | mole equivalent |
| EXAMPLE XI $R_1 = 1.80; R_2 = 1.32$ | | |
| Magnesium | 2.40 | equivalents |
| Calcium | 3.78 | equivalents |
| Aluminum | 11.10 | equivalents |
| Phosphoric acid | 13.08 | mole equivalent |
| EXAMPLE XII $R_1 = 1.70; R_2 = 1.20$ | | |
| Magnesium | 0 | equivalents |
| Calcium | 5.83 | equivalents |
| Aluminum | 9.90 | equivalents |
| Phosphoric acid | 13.06 | mole equivalent |
| EXAMPLE XIII $R_1 = 2.30; R_2 = 1.50$ | | |
| Magnesium | 5.94 | equivalents |
| Calcium | 0 | equivalents |
| Aluminum | 13.66 | equivalents |
| Phosphoric acid | 13.06 | mole equivalent |
| EXAMPLE XIV $R_1 = 2.25; R_2 = 1.25$ | | |
| Magnesium | 5.02 | equivalents |
| Calcium | 0 | equivalents |
| Aluminum | 11.32 | equivalents |
| Phosphoric acid | 13.06 | mole equivalent |
| EXAMPLE XV $R_1 = 2.25; R_2 = 1.25$ | | |
| Magnesium | 0 | equivalents |
| Calcium | 5.02 | equivalents |
| Aluminum | 11.32 | equivalents |
| Phosphoric acid | 13.06 | mole equivalent |

Examples V, VI, VII, XIV and XV were chosen to show that the magnesium and calcium can vary widely in relation to each other and that, although a mixture of calcium and magnesium is preferred because of economic and other reasons, binders can be made in which either calcium or magnesium may be absent.

The following table lists the preferred materials for the practice of this invention except for the class of high magnesium limes lying between normal lime of low magnesium content and normal dolomitic lime which contains equivalent amounts of magnesium and calcium.

| Material | Formula Wt. | Chemical Equiv. | Parts by Weight Per Chem. Equiv. |
|---|---|---|---|
| CaO | 56 | 2 | 28 |
| Ca(OH)$_2$ | 74 | 2 | 37 |
| Ca CO$_3$ | 100 | 2 | 50 |
| MgO | 40.3 | 2 | 20.15 |
| Mg(OH)$_2$ | 58.3 | 2 | 29.15 |
| Mg CO$_3$ | 84.3 | 2 | 42.15 |
| MgCO$_3$ . CaCO$_3$ (Dolomite) | 184.3 | 4 | 46.1 |
| CaO MgO Dolomitic Quick Lime | 96.3 | 4 | 24.1 |
| Ca(OH)$_2$ . Mg(OH)$_2$ Dolomitic Hydrated Lime | 132.3 | 4 | 33.1 |
| Al (OH)$_3$ | 8 | 3 | 26 |
| H$_3$ PO$_4$ | 98 | — | 98 (per mole) |

The materials lying between dolomitic lime and ordinary calcium lime are also useful and can be treated as mixtures of dolomitic and ordinary calcium lime. For these materials analyses are traditionally reported in % as MgO and CaO. The use of a material whose reported analysis was 20% and 80% CaO would give identical results as for the use of a mixture containing 47.8% dolomitic quick lime and 52.2% of ordinary calcium quick lime. For any material classed as high magnesium lime with the analysis expressed as % MgO and % CaO a blend of dolomitic quick lime and ordinary calcium quick lime can be made the composition of which is:

Parts dolomitic quick lime = (2.39) (%MgO)

Parts ordinary calcium quick lime = %CaO −(1.39)(%MgO)

For example, examples VII and IX were made with a very high magnesium content quick lime the reported analysis of which was 37% MgO and 58% CaO. The same result would have been listed for the calcium and magnesium equivalents if a blend of:

88.5 parts CaO.MgO (dolomitic quick lime) and
6.5 parts CaO (calcium quick lime)

had been used to supply the magnesium and calcium equivalents.

Taking example V as representative (any other example would do as well) of the possible binder compositions, the following sample formulations using the preferred materials that will meet the composition requirements are listed for those not familiar with the art.

| | EXAMPLE V | $R_1 = 2.25; R_2 = 1.25$ | |
|---|---|---|---|
| | Magnesium | 3.77 | equivalents |
| | Calcium | 1.25 | equivalents |
| | Aluminum | 11.32 | equivalents |
| | H$_3$PO$_4$ | 13.06 | mole equivalent |
| (a) | Magnesium oxide | 76 | parts by weight |
| | Calcium oxide | 35 | parts by weight |
| | Aluminum hydroxide | 295 | parts by weight |
| | H$_3$ PO$_4$, 75% | 1710 | parts by weight |
| (b) | Magnesium oxide | 76 | parts by weight |
| | Calcium hydroxide | 46.3 | parts by weight |
| | Aluminum hydroxide | 295 | parts by weight |
| | H$_3$PO$_4$, 100% | 1280 | parts by weight |
| (c) | Magnesium oxide | 76 | parts by weight |
| | Calcium carbonate | 62.5 | parts by weight |
| | Aluminum hydroxide | 295 | parts by weight |
| | H$_3$ PO$_4$, 75% | 1710 | parts by weight |
| (d) | Magnesium oxide | 50.7 | parts by weight |
| | Dolomitic quick lime | 60.2 | parts by weight |
| | Aluminum hydroxide | 295 | parts by weight |
| | H$_3$ PO$_4$, 85% | 1505 | parts by weight |
| (e) | Magnesium oxide | 50.7 | parts by weight |
| | Hydrated dolomitic lime | 82.5 | parts by weight |
| | Aluminum hydroxide | 295 | parts by weight |
| | H$_3$ PO$_4$, 75% | 1710 | parts by weight |
| (f) | Magnesium oxide | 50.7 | parts by weight |
| | Uncalcined dolomite | 115 | parts by weight |
| | Aluminum hydroxide | 295 | parts by weight |
| | H$_3$ PO$_4$, 100% | 1280 | parts by weight |

(g), (h) and (i) same as (a), (b) and (c) except replace 76 parts by weight of MgO with 110 parts by weight of Mg(OH)$_2$.

(j), (k) and (l) same as (d), (e) and (f) except replace 50.7 parts by weight of MgO with 73.5 parts by weight of Mg(OH)$_2$.

(m), (n) and (o) same as (a), (b) and (c) except replace 76 parts be weight of MgO with 159 parts by weight of MgCO$_3$.

(p), (q) and (r) same as (d), (e) and (f) except replace 50.7 parts by weight of MgO with 106 parts by weight of MgCO$_3$.

Using a high magnesium quick lime intermediate between dolomitic quick lime and ordinary calcium quick lime, the procedure requires only a slight bit more calculation to arrive at the proper quantities. If an analysis of 25% MgO and 75% CaO is assumed, to get 35 parts of CaO will require 46.7 parts of material. This also will supply 11.7 parts of the required 76 parts of MgO. It can then be said that:

| (s) | MgO required is 76.0 – 11.7 | = | 64.3 parts by weight |
| | High magnesium quick lime (75% CaO) (25% MgO) | = | 46.7 parts by weight |
| | Aluminum hydroxide | | 295 parts by weight |
| | H$_3$PO$_4$, 75% | | 1710 parts by weight |

The same type of illustration can be given if examples of the use of a high magnesium hydrated lime or a high magnesium uncalcined limestone are desired.

Although calcium and magnesium are the preferred materials to use with aluminum in the binder of this invention because of low price, availability, and small weight required to furnish the needed metallic equivalents, as has been indicated, other materials can be used that give equally satisfactory results. Binders have been made that contain strontium, antimony, lead, iron, cadmium, or zinc in place of or in conjunction with calcium or magnesium or both.

Toxicity, availability, price, and the comparatively large amounts required will limit the usefulness of most of these. However, zinc or a zinc-cadmium mixture such as found in dusts from zinc smelting operations may be of economic importance.

Binders have been made by the method of this invention and used to bond mixtures of molecular sieve and activated alumina in which the binder composition was modified to have zinc as one of the components as follows:

| EXAMPLE 1. | |
|---|---|
| Calcium equivalents | 1.67 |
| Magnesium equivalents | 1.67 |
| Zinc equivalents | 1.68 |
| Aluminum equivalents | 11.32 |
| Phosphoric acid - moles | 13.06 |
| EXAMPLE 2. | |
| Calcium equivalents | 1.67 |
| Zinc equivalents | 3.35 |
| Aluminum equivalents | 11.32 |
| Phosphoric acid - moles | 13.06 |
| EXAMPLE 3. | |
| Zinc equivalents | 2.94 |
| Aluminum equivalents | 6.62 |
| Phosphoric acid - moles | 7.65 |
| EXAMPLE 4. | |
| Magnesium equivalents | 1.67 |
| Zinc equivalents | 3.35 |
| Aluminum equivalents | 11.32 |
| Phosphoric acid - moles | 13.06 |

The source of the zinc equivalents was either zinc dust or zinc oxide. Impurities in the raw materials created no particular problems as long as pulverized materials were used for making the slurry. The impurities would normally appear in small quantities and would become a part of the binder or remain as undissolved solids suspended in the liquid.

In using the binder of this invention for making porous cores or barrier materials for filtering, drying and removing acids from refrigeration or air conditioning systems, the active components (desiccants), in dry form may simply be mixed with the liquid binder, immediately formed into the desired shape by conventional molding techniques, dried and fired to activate the desiccants.

Merely by way of illustration and not by way of limitation, 400 grams of binder, containing about 50% by weight of water, is dispensed into a cup. Six hundred and thirty grams of activated alumina (Alcoa F-1) and 35 grams of crystalline zeolite molecular sieve are introduced into the cup. The binder and desiccants are then mixed on a planetary type mixer such as a Hobart Manufacturing Company mixer for 30 seconds during which time the contents of the cup are mixed thoroughly, with each particle of desiccant being coated with binder. The mixed material is then placed immediately into a mold, pressed, and ejected. It is then inspected, dried and fired at 630° F.

Other active ingredients, such as activated alumina gel or other desiccant, filtering and acid removing materials can be used. Varying proportions of active components with respect to one another and to the amount of binder can be used, to provide any desired characteristic of flow capacity, filtration, and water and acid removal. Preferably the binder is first put into the cup, because the adding of the dry solids to the liquid binder minimizes any dust problem. However, the binder can be added simultaneously with the addition of the solids, or the binder can be dispensed into a cup containing the solids if desired.

By using the technique described, an efficient assembly line production of blocks or cores can be achieved. The active materials can be used as received from the supplier in a nominal fully activated condition. They can be dispensed manually or by automatic dispensing equipment into cups which, after the mixing and dumping steps, can be immediately recycled. The mold parts can also be recycled quickly and the green formed unit placed on a conveyor for inspection before going to the drying and activation operation.

This is in contrast to the conventional procedures which have required separate handling equipment for adding water into a blend of desiccants, weighing out the correct amount of hydrated desiccants and ultimately driving off the water from the saturated mix (cf. Figert, U.S. Pat. No. 3,025,233, column 4, line 70).

Having thus described the invention, what is claimed and desired to be secured by Letters Patent is:

1. A modified aluminum phosphate binder consisting essentially of an aqueous solution of phosphates of aluminum and at least one of the group consisting of calcium, magnesium, zinc, strontium, antimony, lead, iron and cadmium, said solution being formed by the controlled reaction of phosphoric acid and an aqueous slurry of at least one of salts of said metals taken from the group consisting of oxides, hydroxides and carbonates, wherein the number of equivalents of aluminum is within the range of about 0.70 to 2.90 times the total equivalents of the other metal or metals and the total number of equivalents of said aluminum and other metal or metals is within the range of about 1.00 to 1.80 times the number of mole equivalents of phosphoric acid required to supply the phosphate content of the binder.

2. A modified aluminum phosphate binder consisting essentially of an aqueous solution of calcium, magnesium, and aluminum phosphates, said solution being formed by the controlled reaction of phosphoric acid and an aqueous slurry of at least one of salts of calcium, magnesium and aluminum, taken from the group consisting of oxides, hydroxides and carbonates, in which the number of equivalents of aluminum is within the range of 0.70 to 2.90 times the sum of the calcium and magnesium equivalents and in which the total calcium, magnesium and aluminum equivalents is within the range of 1.00 to 1.80 times the number of moles of phosphoric acid required to supply the phosphate content of the binder.

3. A modified aluminum phosphate binder consisting essentially of an aqueous solution of magnesium and aluminum phosphates, said solution being formed by the controlled reaction of phosphoric acid and an aqueous slurry of at least one of salts of magnesium and aluminum taken from the group consisting of oxides, hydroxides and carbonates, in which the number of equivalents of aluminum is within the range of 0.70 to 2.90 times the number of equivalents of magnesium, and in which the total magnesium and aluminum equivalents is within the range of 1.00 to 1.80 times the number of moles of phosphoric acid required to supply the phosphate content of the binder.

4. A modified aluminum phosphate binder consisting essentially of an aqueous solution of calcium and aluminum phosphates, said solution being formed by the controlled reaction of phosphoric acid and an aqueous slurry of at least one of salts of calcium and aluminum taken from the group consisting of oxides, hydroxides and carbonates, in which the number of equivalents of aluminum is within the range of 0.70 to 2.90 times the number of equivalents of calcium and the total calcium and aluminum equivalents is within the range of 1.00 to 1.40 times the number of moles of phosphoric acid required to provide the phosphate content of the binder.

5. A modified aluminum phosphate binder consisting essentially of an aqueous solution of calcium, magnesium, zinc and aluminum phosphates, said solution being formed by the controlled reaction of phosphoric acid and an aqueous slurry of at least one of salts of calcium, magnesium, zinc and aluminum taken from the group consisting of oxides, hydroxides, and carbonates, in which the number of aluminum equivalents is within the range of 0.70 to 2.90 times the sum of the calcium, magnesium, and zinc equivalents and the total calcium, magnesium, zinc and aluminum equivalents is within the range of 1.00 to 1.80 times the number of moles of phosphoric acid required to furnish the phosphate content of the binder.

6. A modified aluminum phosphate binder consisting essentially of an aqueous solution of calcium, zinc and aluminum phosphates, said solution being formed by the controlled reaction of phosphoric acid and an aqueous slurry of at least one of salts of calcium, zinc and aluminum taken from the group consisting of oxides, hydroxides and carbonates, in which the number of aluminum equivalents is within the range of 0.70 to 2.90 times the sum of the calcium and zinc equivalents and the total calcium, zinc and aluminum equivalents is within the range of 1.00 to 1.80 times the number of moles of phosphoric acid needed to supply the phosphate content of the binder.

7. A modified aluminum phosphate binder consisting essentially of an aqueous solution of zinc and aluminum phosphates, said solution being formed by the controlled reaction of phosphoric acid and an aqueous slurry of at least one of salts of zinc and aluminum taken from the group consisting of oxides, hydroxides and carbonates, in which the number of aluminum equivalents is within the range of 0.70 to 2.90 times the number of zinc equivalents and the total zinc and aluminum equivalents is within the range of 1.00 to 1.80 times the number of moles of phosphoric acid required to furnish the phosphate content of the binder.

8. A modified aluminum phosphate binder consisting essentially of an aqueous solution of magnesium, zinc and aluminum phosphates, said solution being formed by the controlled reaction of phosphoric acid and an aqueous slurry of at least one of salts of magnesium, zinc and aluminum taken from the group consisting of oxides, hydroxides and carbonates, in which the aluminum equivalents is within the range of 0.70 to 2.90 times the sum of the magnesium and zinc equivalents and the total magnesium, zinc and aluminum equivalents is within the range of 1.00 to 1.80 times the number of moles of phosphoric acid required to furnish the phosphate content of the binder.

9. A method of manufacturing a liquid solution of a modified aluminum phosphate binder comprising the steps of preparing an aqueous slurry of aluminum hydroxide and at least one other metal compound taken from the group consisting of zinc dust and oxides, hydroxides and carbonates of calcium, magnesium, zinc, strontium, antimony, lead, iron and cadmium, combining said slurry with phosphoric acid to cause the components of the slurry to react with said phosphoric acid at a rate such as to produce and maintain a temperature of the reactants sufficiently high to permit essentially complete solution of the slurry components in said acid, said aluminum and said other metal compound or compounds being present in said slurry in relative amounts such that the number of equivalents of aluminum is within the range of about 0.70 to 2.90 times the total equivalents of the other metal or metals and the total number of equivalents of said aluminum and other metal or metals is within the range of about 1.00 to 1.80 times the number of mole equivalents of said phosphoric acid.

10. A method of manufacturing a liquid solution of a modified aluminum phosphate binder comprising the steps of preparing an aqueous slurry of aluminum hydroxide and at least one other metal compound of the group consisting of calcium oxide, calcium hydroxide, magnesium oxide, magnesium hydroxide, and zinc oxide, combining said slurry with phosphoric acid to cause the components of said slurry to react with said phosphoric acid at a rate such as to produce and maintain a temperature of the reactants sufficiently high to permit essentially complete solution of the slurry components in said acid, said aluminum and said other metal compound or compounds being present in said slurry in relative amounts such that the number of equivalents of aluminum is within the range of about 0.70 to 2.90 times the total equivalents of the other metal of metals and the total number of equivalents of said aluminum and other metal or metals is within the range of about 1.00 to 1.80 times the number of mole equivalents of said phosphoric acid.

* * * * *